United States Patent
Kawiecki et al.

(10) Patent No.: US 10,967,967 B2
(45) Date of Patent: Apr. 6, 2021

(54) SYSTEMS AND METHODS FOR WINGED DRONE PLATFORM

(71) Applicant: The Boeing Company, Chicago, IL (US)

(72) Inventors: Grzegorz M. Kawiecki, El Escorial (ES); Michael W. Hardt, Colmenar Viejo (ES)

(73) Assignee: THE BOEING COMPANY, Chicago, IL (US)

( * ) Notice: Subject to any disclaimer, the term of this patent is extended or adjusted under 35 U.S.C. 154(b) by 598 days.

(21) Appl. No.: 15/691,611

(22) Filed: Aug. 30, 2017

(65) Prior Publication Data

US 2019/0061934 A1 Feb. 28, 2019

(51) Int. Cl.
*B64C 29/00* (2006.01)
*B64C 39/02* (2006.01)
*B64C 9/00* (2006.01)
*B64C 9/14* (2006.01)

(52) U.S. Cl.
CPC ........ *B64C 29/0033* (2013.01); *B64C 39/024* (2013.01); *B64C 9/14* (2013.01); *B64C 2009/005* (2013.01); *B64C 2201/042* (2013.01); *B64C 2201/104* (2013.01); *B64C 2201/108* (2013.01); *B64C 2201/141* (2013.01)

(58) Field of Classification Search
CPC . B64C 29/0033; B64C 29/0075; B64C 11/46; B64C 11/28
See application file for complete search history.

(56) References Cited

U.S. PATENT DOCUMENTS

| | | | | |
|---|---|---|---|---|
| 8,646,720 | B2* | 2/2014 | Shaw | B64C 29/0025 244/17.23 |
| 8,800,912 | B2* | 8/2014 | Oliver | B64C 29/0033 244/12.4 |
| 9,475,579 | B2* | 10/2016 | Fredericks | B64C 25/52 |
| 9,694,911 | B2* | 7/2017 | Bevirt | B64D 27/24 |
| 2014/0158815 | A1 | 6/2014 | Renteria | |

(Continued)

OTHER PUBLICATIONS

Anderson, Jr., John D., "5.3.3 Effect of Aspect Ratio", Fundamentals of Aerodynamics, Incompressible Flow over Finite Wings, 2011, pp. 438-444, Fifth Edition, The McGraw-Hill Companies, Inc., New York, NY.

(Continued)

*Primary Examiner* — Brian M O'Hara
(74) *Attorney, Agent, or Firm* — Haynes and Boone, LLP (57) ABSTRACT

Various techniques are provided for a winged drone platform. In one example, a drone can be provided. The drone can include a drone body, a plurality of wings, a plurality of tiling propeller assemblies, and a drone controller. The wings can be coupled to the drone body and configured to generate lift when the drone travels in a first travel direction. The tilting propeller assemblies can each be supported by one of the wings, can include a propeller and a propeller powerplant connected to the propeller, and can be configured to move between at least a first position and a second position. The drone controller can provide instructions to the tilting propeller assemblies to move between at least the first position and the second position. Additional systems and related methods are also provided.

19 Claims, 11 Drawing Sheets

(56) References Cited

U.S. PATENT DOCUMENTS

| | | | | |
|---|---|---|---|---|
| 2015/0360775 | A1* | 12/2015 | Arai | B64D 27/24 244/12.1 |
| 2016/0031555 | A1* | 2/2016 | Bevirt | B64C 11/28 244/7 C |
| 2019/0291863 | A1* | 9/2019 | Lyasoff | B64D 31/06 |

OTHER PUBLICATIONS

Anderson, Jr., John D., "5.5 The Lifting-Surface Theory and the Vortex Lattice Numerical Method", Fundamentals of Aerodynamics, Incompressible Flow over Finite Wings, 2011, pp. 462-463, Fifth Edition, The McGraw-Hill Companies, Inc., New York, NY.

UAS Vision, "Pivoting HexaCopter", 5 pages [online], [retrieved Oct. 9, 2017]. Retrieved from the Internet: <URL:http://www.uasvision.com/2017/01/25/pivoting-hexacopter/>.

UAS Vision, "NASA Explores Drone Aerodynamics", 2 pages [online], [retrieved on Oct. 9, 2017]. Retrieved from the Internet: <URL:https://www.uasvision.com/2017/01/18/nasa-explores-drone-aerodynamics/>.

Phantom 3 Professional, "User Manual V1.8", 59 pages [online], [retrieved on Nov. 20, 2017]. Retrieved from the Internet: <URL:http://www.dji.com/phantom-3-pro/info>.

"Bell Boeing Quad TiltRotor", 4 pages [online], [retrieved on Oct. 9, 2017]. Retrieved from the Internet: <URL:https://en.wikipedia.org/wiki/Bell_Boeing_Quad_TiltRotor>.

UAS Vision, "Transitioning Quadcopter from Germany", 3 pages [online], [retrieved on Oct. 9, 2017]. Retrieved from the Internet: <URL:http://www.uasvision.com/2016/09/08/transitioning-quadcopter-from-germany>.

UAS Vision, "German Mapping Quadplane Launched", 2 pages [online], [retrieved on Oct. 9, 2017]. Retrieved from the Internet: <URL:http://www.uasvision.com/2016/12/15/german-mapping-quadplane-launched>.

Vidello Productions, "EHang 184 MegaDrone—Worlds First Self Driving Taxi Car", 2 pages [online], [retrieved on Oct. 9, 2017]. Retrieved from the Internet: <URL:https://www.youtube.com/watch?v=1iyCgv1juHc>.

Ali, Salim, "Pilotless Flying Cars versus Driverless Cars", 8 pages [online], [retrieved on Oct. 9, 2017]. Retrieved from the Internet: <URL:http://www.safetyparadigm.com/pilotless-flying-cars-versus-driverless-cars/>.

Report Linker, "The Business of Luxurious Cars: Must-Read Reports & Analysis", 5 pages [online], [retrieved on Oct. 9, 2017]. Retrieved from the Internet: <URL:https://www.reportlinker.com/ci02180/Luxury-Automobile.html>.

Issod, Craig, "Worldwide Consumer Camera Drone Sales Numbers For 2015 and 2016", 4 pages [online], [retrieved on Oct. 9, 2017]. Retrieved from the Internet: <URL:https://www.droneflyers.com/worldwide-consumer-camera-drone-sales-numbers-for-2015-and-2016/>.

Wood, Laura, "Research and Markets: The Global Unmanned Aerial Vehicle Market 2015-2025—Market Size and Drivers of the $115 Billion Industry", 3 pages [online], [retrieved on Oct. 9, 2017]. Retrieved from the Internet: <URL:http://www.businesswire.com/news/home/20150408006401/en/Research-Markets-Global-Unmanned-Aerial-Vehicle-Market>.

Cetinsoy et al., "Design and construction of a novel quad tilt-wing UAV", Mechatronics, Sep. 2012, pp. 723-745, vol. 22, Issue 6, Elsevier Ltd., Amsterdam, Netherlands.

Dimchev, Momchil, "4.4 Results", Experimental and numerical study on wingtip mounted propellers for low aspect ratio UAV design, Mar. 30, 2012, pp. 43-45, Delft University of Technology, Delft, Netherlands.

Eddy, Nathan, "Google's Larry Page Investing Millions In Flying Cars", 10 pages [online], [retrieved Oct. 9, 2017]. Retrieved from the Internet: <URL:https://www.informationweek.com/it-life/googles-larry-page-investing-millions-in-flying-cars-/d/d-id/1325855>.

Linn, Allison, "Flying car not as far-fetched a fantasy as you might think", Aug. 29, 2004, 2 pages [online], honoluluadvertiser.com, [retrieved on Oct. 10, 2017]. Retrieved from the Internet: <URL:http://the.honoluluadvertiser.com/article/2004/Aug/29/bz/bz06a.html>.

Lowy, Joan, "A commuter's dream: Entrepreneurs race to develop flying car", Jan. 30, 2017, 4 pages [online], washingtonpost.com, [retrieved on Feb. 9, 2017]. Retrieved from the Internet: <URL:https://www.washingtonpost.com/business/technology/a-commuters-dream-entrepreneurs-race-to-develop-flying-car/2017/01/30/108813f4-e6c7-11e6-903d-9b11ed7d8d2a_story.html?utm_term=.daff610ff2af>.

Majhi et al., "Modeling Helicopter Rotor Blade Flapping Motion Considering Nonlinear Aerodynamics", Computer Modeling in Engineering & Sciences, 2008, pp. 25-36, vol. 27, No. 1, Tech Science Press, Henderson, NV.

McCrink et al., "Blade Element Momentum Modeling of Low-Re Small UAS Electric Propulsion Systems", $33^{rd}$ AIAA Applied Aerodynamics Conference, Jun. 22-26, 2015, pp. 1-23, American Institute of Aeronautics and Astronautics, Reston, VA.

Patterson et al., "Effect of a Wing-Tip Mounted Pusher Turboprop on the Aerodynamic Characteristics of a Semi-Span Wing", AIAA/SAE/ASME/ASEE $21^{st}$ Joint Propulsion Conference, Jul. 8-10, 1985, pp. 1-9, American Institute of Aeronautics and Astronautics, Reston, VA.

Snyder, Jr. et al., "Effects of Wiptip-Mounted Propellars on Wing Lift and Induced Drag", Journal of Aircraft, Sep. 1969, pp. 393-397, vol. 6, No. 5, American Institute of Aeronautics and Astronautics, Reston, VA.

* cited by examiner

SYSTEMS AND METHODS FOR WINGED DRONE PLATFORM

TECHNICAL FIELD

The disclosure relates generally to drone aircraft systems and more specifically to multi-rotor drones that include lift generating control surfaces.

BACKGROUND

Existing drones are inefficient in flight. Such inefficiency limits the range of such drones and/or increases the size and weight of the drone as a larger energy storage unit is required, leading to poorer performance. More efficient drones that increase performance and/or range are thus needed.

SUMMARY

Systems and methods are disclosed for a winged drone platform. In a certain example, a drone can be provided that includes a drone body, a plurality of wings coupled to the drone body, each wing including a front facing leading edge and a rear facing trailing edge and configured to generate lift when the drone travels in a first travel direction, and a plurality of tilting propeller assemblies, each tilting propeller assembly supported by at least one of the plurality of wings, including a propeller and a propeller powerplant connected to the propeller, and configured to move between at least a first position for take-off and a position for cruise flight configured so that the tilting propeller assemblies provide forward thrust.

In another example, a method can be provided that includes taking off with a drone by positioning a plurality of tilting propeller assemblies of the drone in a first position, moving the tilting propeller assemblies from the first position to a position for cruise flight, and flying the drone with the tilting propeller assemblies in the position for cruise flight in a first travel direction to generate lift from a plurality of wings of the drone, wherein each wing comprises a front facing leading edge and a rear facing trailing edge.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various embodiments of a drone aircraft with wings configured to generate lift are disclosed herein along with related methods. Such a drone aircraft can include a drone body, wings, and tilting propeller assemblies. The wings are coupled to the drone body and are configured to generate lift when the drone travels in a forward direction. The tilting propeller assemblies are each coupled to a wing. The tilting propeller assemblies can tilt to provide at least upward thrust in a first position and provide at least forward thrust in a second position. In certain examples, the tilting propeller assemblies are configured to tilt along with the wings or a portion of the wings, while other examples can include propeller assemblies that tilt independently of the wings.

"Drone" as used herein can refer to any aircraft without a human pilot aboard. Such an aircraft can be, but not necessarily is, an unmanned aerial vehicle. For example, "drone" as used herein can refer to an unmanned aerial vehicle or to transport systems such as manned aerial vehicles without a pilot.

Existing multi-rotor drones can utilize radial arms, attached to a main body, that support propellers. The propellers are often installed on the ends of the radial arms. In such a configuration, the propellers are configured to provide all of the lift and propulsive forward thrust required for flight. The propulsive forward thrust is provided by tilting the entire drone (e.g., the body, the radial arms, and the propellers). However, such a flight technique, utilizing the propellers to provide all of both upward and forward thrust, is inefficient and, thus limits range and/or increases the size and weight of the drone. Additionally, other such examples of drones generate lift, even in forward thrust, with the propellers. Such techniques are also inefficient.

Figure 1:
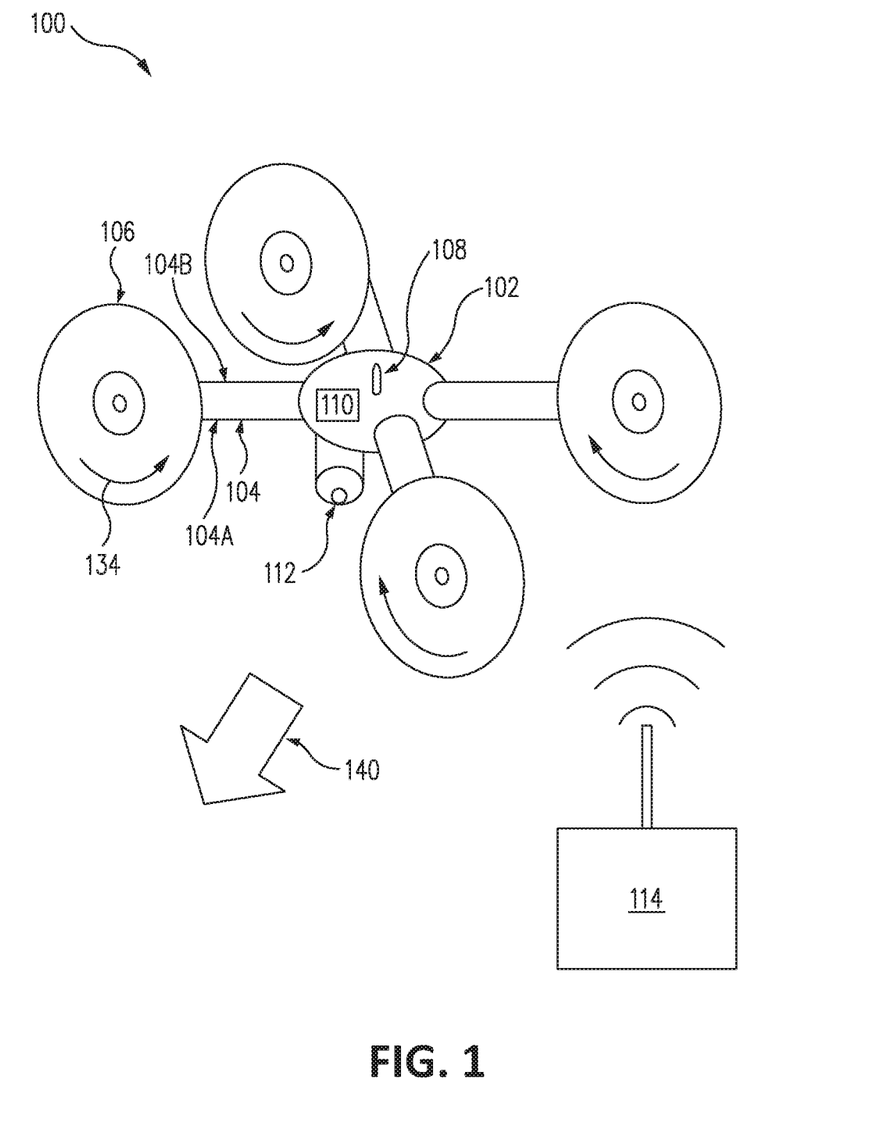
FIG. 1 illustrates a drone aircraft in accordance with an embodiment of the disclosure.

FIG. 1 illustrates a drone aircraft in accordance with an embodiment of the disclosure. The drone 100 includes a drone body 102, wings 104, and tilting propeller assemblies 106. The drone 100 also includes communications circuitry 108, drone controller 110, and attachment device 112. In certain examples, the drone 100 can also include a remote controller 114 that can be part of a drone system.

The drone body 102 can be a main structure of the drone 100 and at least some other components of the drone 100 can attach to the drone body 102. In certain examples, the drone body 102 can contain a drone controller 110 and/or communications circuitry 108 within an interior or on an exterior of the drone body 102. The drone body 102 can be configured to receive and absorb dynamic forces (e.g., from movement and/or acceleration of the drone 100) and aerodynamic forces (e.g., from airflow around the drone 100) acting on the drone 100. In certain examples, the drone body 102 can be a molded and/or cast body, a spaceframe and an outer skin, a monocoque, and/or other such type of body. The drone body 102 can be made from any sort of plastic, composite, metal, wood, glass, and/or any other sort of suitable material.

One or more wings 104 can be coupled to the drone body 102. Each wing 104 can include a front facing (as defined by the direction of travel) leading edge 104A and a rear facing trailing edge 104B. In certain examples, the wings 104 can substitute for or complement the radial arms utilized on drones. The wings 104 can be shaped and can be configured to generate aerodynamic forces at least when the drone 100 is traveling in a first travel direction (e.g., a forward travel direction). For example, the cross-sections of the wings 104 can be elliptical shaped, airfoil shaped (e.g., NACA airfoil), or otherwise shaped to generate the aerodynamic forces. Such cross-sections can be symmetrical or asymmetrical. Certain such airfoils can include a symmetrical cross-section in one portion, and an asymmetrical cross-section in another portion. The aerodynamic forces can include lift, download, and/or forces used to provide control the drone 100 (e.g., for yaw).

In certain examples, one or more wings can be fixed, but other examples can include wings that are configured to rotate, translate, or otherwise move between at least a takeoff position to decrease aerodynamic resistance when the drone 100 is taking off and/or gaining attitude (e.g., taking off vertically) and a cruise flight position where one or more wings can be configured to generate aerodynamic forces when the drone 100 is traveling in a forward travel direction. Certain examples can include wings that include one or more movable parts. The one or more movable parts can include flaps, ailerons, elastically deformable portions (that can, for example, modify aerodynamic loads), and/or other such movable parts. In certain examples, the chord line of the wing 104 can be oriented substantially vertically (e.g., within 30 degrees of vertical) in the takeoff position and can be oriented substantially horizontally (e.g., within 30 degrees of horizontal) in the cruise flight position. Certain other examples of the wing 104 can be configured to move to other positions.

Certain examples of the wing 104 can be a one-piece wing. That is the wing 104 can be shaped or contoured to generate lift, but does not move, only moves as a single unit, or can include portions that elastically deform to change the shape of the wing 104 (e.g., to generate aerodynamic loads without using discrete aerodynamic devices such as ailerons or flaps). Other examples of the wing 104 can include a wing main body and one or more flaps, ailerons, and/or other control surfaces that can rotate and/or translate relative to the main body of the wing 104. As such, such wings 104 can be multi-piece wings. Certain such examples of multi-piece wings can have such flaps, ailerons, and/or other control surfaces each coupled to the main body of the wing 104, but other examples can include one or more flaps, ailerons, and/or other control surfaces coupled to each other.

The tilting propeller assemblies 106 can be coupled to the wing 104. The tilting propeller assemblies 106 of the drone 100 of FIG. 1 are coupled to the wings 104 on the ends of the wings 104, but other examples can couple the tilting propeller assemblies 106 to other portions of the wings 104 (e.g., in the middle of the wing 104, or on a portion of the wing 104 closer to the drone body 102). Certain other examples of the tilting propeller assemblies 106 can be coupled to a plurality of wings (e.g., can be coupled to a main wing and a brace wing, two main wings, and/or three or more wings).

Each of the tilting propeller assemblies 106 can include a propeller and a propeller powerplant. The propeller powerplant can power the propeller (e.g., spin the propeller). The propeller powerplant can be electrically powered (e.g., the propeller powerplant can include one or more electrical motors that are powered by one or more batteries stored within the drone 100 and/or powered by one or more solar panels of the drone 100), combustion powered (e.g., powered by an internal combustion engine) and/or powered through other techniques (e.g., energy delivery from external sources such as via a mechanical link and/or beamed using a laser, microwave, or other source). Certain other examples can replace the propeller assemblies 106 with other propulsion techniques such as jet engines, rocket engines, and/or other thrust producing techniques.

In certain examples, the tilting propeller assemblies 106 can be configured to move between at least a first position and a second position. The first position can be a position where the rotation axes of the propellers are oriented substantially vertically (shown in FIG. 2A) and, thus, can provide upward thrust to allow the drone 100 to gain altitude. The second position can be a position where the tilting propeller assemblies can provide forward thrust to allow the drone 100 to travel horizontally (e.g., a position for cruise flight). Cruise flight may be executed with any tilting propeller assemblies orientation that assures aircraft equilibrium in forward flight. Other examples of the tilting propeller assemblies 106 can also be configured to move to other positions, e.g., to a position that makes it possible for a propeller to enter into autorotation. This will require orienting the propeller so that there is a sufficient airflow directed upwards through the propeller. In general, those propellers that are not needed to produce propulsive force, e.g., in forward flight, may be tilted appropriately to generate upward flow through the propeller and/or enter into autorotation and generate an additional lifting force, if needed.

The tilting propeller assemblies 106 can be configured to rotate the propellers at a plurality of rotational speeds. As such, the propeller powerplants of the tilting propeller assemblies 106 can be operated at a plurality of operating speeds, torque values, and/or power values to rotate the propellers at the different speeds. In certain examples, operation of the tilting propeller assemblies 106 can be controlled by the drone controller 110.

In certain such examples, the tilting propeller assemblies 106 can move along with movement of the wings 104 (e.g., when the wings 104 are in the takeoff position, the tilting propeller assemblies 106 are in the first position and when the wings are in the cruise flight position, the tilting propeller assemblies are in the second position), while other examples of the tilting propeller assemblies 104 can move independently of the wings 104 (e.g., the wing 104 can be fixed while the tilting propeller assemblies 106 can move or the wings 104 and the tilting propeller assemblies 106 can both move independently of each other) and/or independently of other tilting propeller assemblies. Examples with independently moving tilting propeller assemblies can allow for improved control of the drone.

In certain examples, the propellers of the tilting propeller assemblies 104 can be configured to rotate in an in-board up direction 134. In the in-board up direction 134, the propellers rotate so that the tips of the propeller rotate generally upward and inward towards the drone body 102 from the nadir of their rotation. The in-board up direction 134 can increase the lift/drag ratio of the wing and increase its effective aspect ratio. Thus, performance of the wings 104 can be improved when the propellers rotate in the in-board up direction. Additionally, when all propellers of the drone 100 are rotating in the in-board up direction 134, gyroscopic forces due to the rotation of the propellers can be eliminated and/or minimized. In certain examples, the drone 100 can be configured for cruise flight in direction 140 and, accordingly, the propeller assemblies 106 can be configured to be positioned so that all propellers rotate in in-board up directions during cruise flight. In cruise flight, the propeller assemblies 104 can be positioned so that downwash from the propeller first passes over or under the leading edges 104A of the wings 104 before passing over or under the trailing edges 104B.

In examples where the propellers are configured to rotate in in-board up directions, each propeller assembly 106 can be positioned at the tip of the wing 104 (e.g., the distal portion of the wing 104), in the middle of the wing 104, and/or at the portion of the wing 104 that couples to the drone body 102.

In certain examples, all of the wings 104 and/or the tilting propeller assemblies 106 can move synchronously with each other while in other examples, at least some of the wings 104 and/or the tilting propeller assemblies 106 can move independently of each other (e.g., one of the wings can move independently of the other wings and/or forward and rearward tilting propeller assemblies can move independently of each other). In particular, some of the propellers can, in certain situations, operate in autorotation, providing additional lifting force, while other propellers provide the propulsive force. Such independent movement of the various components can allow the drone 100 to execute more complex movement and/or provide additional control methods (e.g., through the use of independently moving tilting propeller assemblies). In such examples though, the drone controller 110 can be configured to control the independent movement of the tilting propeller assemblies 106 and/or the wings 104 according to control algorithms similar to, for example, a drive-by-wire system.

The drone 100 can be configured for forward flight in direction 140. As such, the drone 100, and components thereof, can be configured for forward flight in direction 140. Thus, the wings 104 of the drone 100 can be configured to generate lift when the drone 100 flies in direction 140. Such wings can be profiled so that, when the wings are at least oriented in a position appropriate for forward flight, the wings generate lift. For example, the wings 104 can each include a leading edge 104A and a trailing edge 104B. When flying in direction 140, air flows over/under the leading edge 104A before flowing over/under the trailing edge 104B. In examples where the wings are oriented such that the leading edge 104A is not perpendicular to the direction of flight (e.g., direction 140) such as shown in FIG. 1, the wings 104 can be profiled so that the wings 104 can generate lift when traveling in such a direction of flight even if the leading edge 104A is not perpendicular to the direction of flight.

Accordingly, the four wings of the drone 100 can be positioned so that, when the drone 100 is in forward flight and is in a configuration that accommodates forward flight, some or all of the four wings are configured to generate lift when in forward flight. Certain such examples can have all of the wings 104 be configured to generate lift when in forward flight (e.g., all four wings of the drone 100 can be configured to generate lift when the drone 100 is flying in direction 140).

Referring to the drone controller 110, movement of the wings 104 and/or the tilting propeller assemblies 106 can be controlled according to instructions provided by the drone controller 110. The drone controller 110 can include, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the drone controller 110 and/or its associated operations can be implemented as a single device or multiple devices (e.g., communicatively linked through wired or wireless connections) to collectively constitute the drone controller 110.

The drone controller 110 can include one or more memory components or devices to store data and information. The memory can include volatile and non-volatile memory. Examples of such memories include RAM (Random Access Memory), ROM (Read-Only Memory), EEPROM (Electrically-Erasable Read-Only Memory), flash memory, or other types of memory. In certain examples, the drone controller 110 can be adapted to execute instructions stored within the memory to perform various methods and processes described herein, including implementation and execution of control algorithms responsive to sensor and/or operator inputs.

Communications circuitry 108 can be configured to receive signals from a device separate from the drone body 102. For example, communications circuitry 108 can be a wireless receiver configured to receive wireless signals from the remote controller 114. Such wireless signals can be radio signals, WiFi signals, Bluetooth signals, laser communications, and/or other such signals and/or communications technique that allow for wireless communications. The communications circuitry 108 can be communicatively coupled to drone controller 110 so that signals received by the communications circuitry 108 can be provided to the drone controller 110. The drone controller 110 can then provide instructions to other parts of the drone 110 responsive to the signals received.

The remote controller 114 can be separate from the drone body 102 (e.g., does not move with drone body 102). The remote controller 114 can be a portable controller such as a handheld controller that an operator of the drone 100 can use to provide instructions to the drone 100. In certain other examples, the remote controller 114 can be a handheld electronic device (e.g., smartphone, wearable electronic device, personal data assistant, and/or other such device), a fixed and/or portable computer, and/or a control station (e.g., a station located within, for example, a base station that controls one or more drones). While certain examples of the remote controller 114 can receive inputs from the user that can be used to pilot the drone 100 and communicate signals indicative of such inputs to the communications circuitry 108, other examples of the remote controller 114 can automatically provide instructions to the drone 100 without user inputs. Additionally, it is appreciated that certain examples of the drone 100 does not include a remote controller 114 and, in such examples, the drone 100 can be controlled by the drone controller 110 (e.g., from preloaded instructions stored by the drone controller 110). Other examples can control the drone 100 through a combination of instructions from the drone controller 110 and the remote controller 114.

The attachment device 112 can be a device that attaches to the drone 100. The attachment device 112 can be coupled to an attachment point coupled to the drone body 102. The attachment point can be a mechanism that is configured to receive one or more types of attachment devices that can be coupled to the drone 100. The attachment devices can be any type of sensor, camera, weapon, firefighting tools, cargo, and/or other such payload that can be carried by the drone 100.

Other examples of the drone 100 can include alternative or additional components. For example, the drone 100 can include one or more sensors such as compasses, environmental sensors, air pressure sensors, altimeters, gyroscopes, accelerometers, and/or other such components. Such components can provide data to the drone controller 110 and/or can be used to help control the drone 100. The drone 100 can utilize data from the one or more sensors to determine how to positions the wings 104 (e.g., positions the wings 104 in an angle and/or configuration for an example of the drone 100 where the wings 104 are movable), position the tiling propeller assemblies 106, and/or determine the operating speeds of or more of the propellers of the tilting propeller assemblies 106.

For example, certain examples of the drone 100 can determine when a crosswind is present. Such a crosswind can affect the aerodynamic performance of the wings 104 and/or the drone 100. Responsive to the crosswind, the position of the wings 104, flaps 508, other deformable and/or movable portions of the wings 104, and/or the tilting propeller assemblies 106 can be adjusted. Certain other examples can adjust one or more components of the drone 100 responsive to a position, velocity, acceleration, travel direction, and/or environmental condition of the drone 100.

Figure 2A:
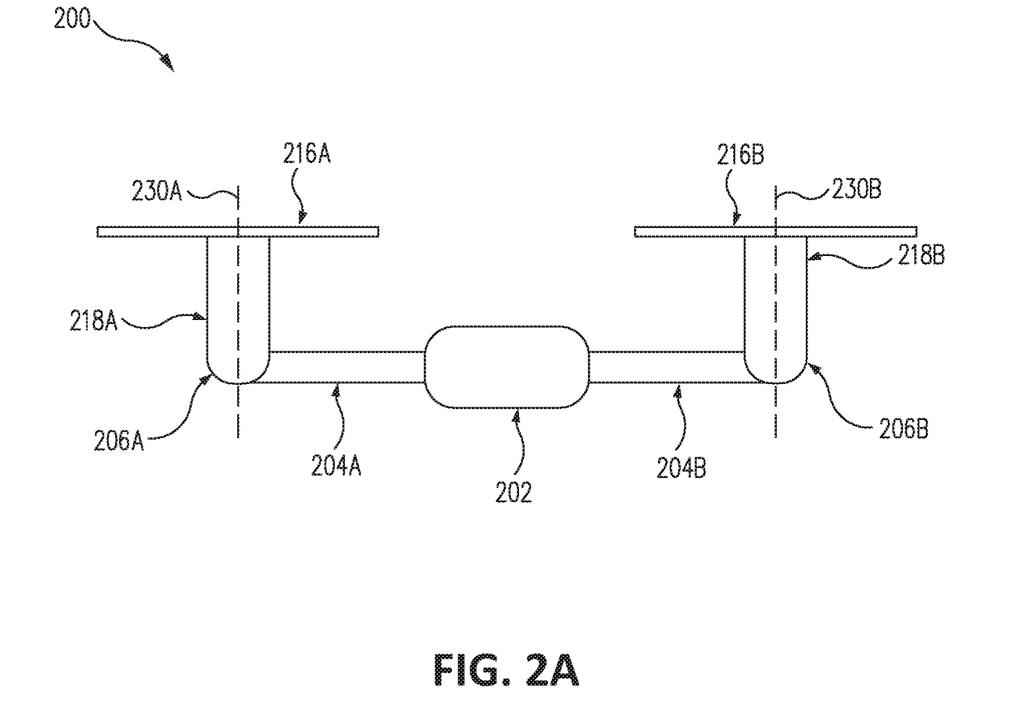
FIGS. 2A and 2B illustrate side views of a drone aircraft during various stages of operation in accordance with an embodiment of the disclosure.
Figure 2B:
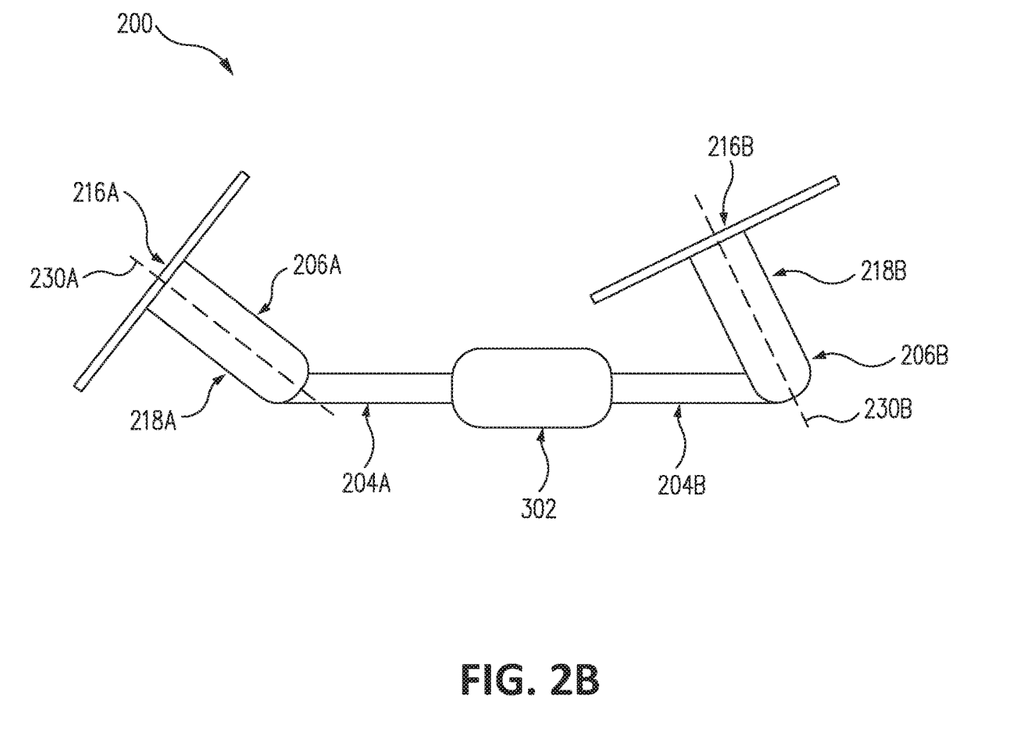

FIGS. 2A and 2B illustrate side views of a drone aircraft during various stages of operation in accordance with an embodiment of the disclosure. FIGS. 2A and 2B illustrate a drone 200 with a drone body 202, wings 204A and 204B, and tilting propeller assemblies 206A and 206B.

The drone body 202 and the wings 204A and 204B can be similar to the drone body 102 and the wings 204 of the drone 100 from FIG. 1. The tilting propeller assemblies 206A and 206B can include propellers 216A and 216B and propeller powerplants 218A and 218B, respectively. The propeller powerplants 218A and 218B can include cowling and/or another such cover over the propeller powerplants 218A and 218B, such as propeller ducts or shrouds, to improve efficiency.

The propellers 216A and 216B can be configured to rotate around the rotation axes 230A and 230B, respectively. In FIG. 2A, the drone 200 can be configured to move vertically (e.g., take-off, land, or hover) and, accordingly, the rotation axes 230A and 230B can be oriented substantially vertically so that the propellers 216A and 216B can produce upward thrust. Such an orientation of the tilting propeller assemblies 216A and 216B can be referred to as the first position. The tilting propeller assemblies 206A and 206B can also be configured to move to a second position that allows the drone 200 to be in cruise flight. In certain examples, when the propeller assemblies 206A and 206B are in the first position shown in FIG. 2A, the wings 204A and 204B can be in the position shown in FIG. 5A and/or in the position shown in FIG. 5D. Tilting propeller assemblies may be also configured to allow the propellers to enter into autorotation.

In FIG. 2B, the tilting propeller assemblies 206A and 206B are moved to a second position. In the second position, the rotation axes 230A and 230B can be angled relative to horizontal. As such, the propellers 216A and 216B can be configured to, for example, provide both upward and horizontal thrust. Other examples of the drone 200 can include tilting propeller assemblies that can be configured to move to additional positions (e.g., more than the first and second positions, such as to enter into autorotation). Also, certain examples of the drone 200 can include propellers that can move independent of the rest of its respective tilting propeller assembly. The drone 200 can move the tilting propeller assemblies 206A and 206B to the second position due to an operating requirement of the drone 200 and/or due to the velocity, acceleration, travel direction, and/or environmental condition of the drone 200 and/or of the environment around the drone 200 (e.g., detected by one or more of an accelerometer, positioning sensor such as a GPS sensor, compass, environmental sensor such as an air pressure sensor, temperature sensor, and/or other such sensor, altimeter, and/or other such sensors).

In certain examples, the second position can be a position used for cruise flight when the wings 204A and 204B of the drone 200 do not generate lift equal to or greater than the weight of the drone 200 (and thus, doesn't generate enough lift to keep the drone 200 fully aloft). In such an example, the propeller assemblies 206A and/or 206B can be oriented in the second position during cruise flight so that the propeller assemblies 206A and/or 206B also provide lift to the drone 200 to keep the drone 200 aloft. In certain examples, when the propeller assemblies 206A and 206B are in the second position shown in FIG. 2B, the wings 204A and 204B can be in any of the positions described herein.

Figure 3:
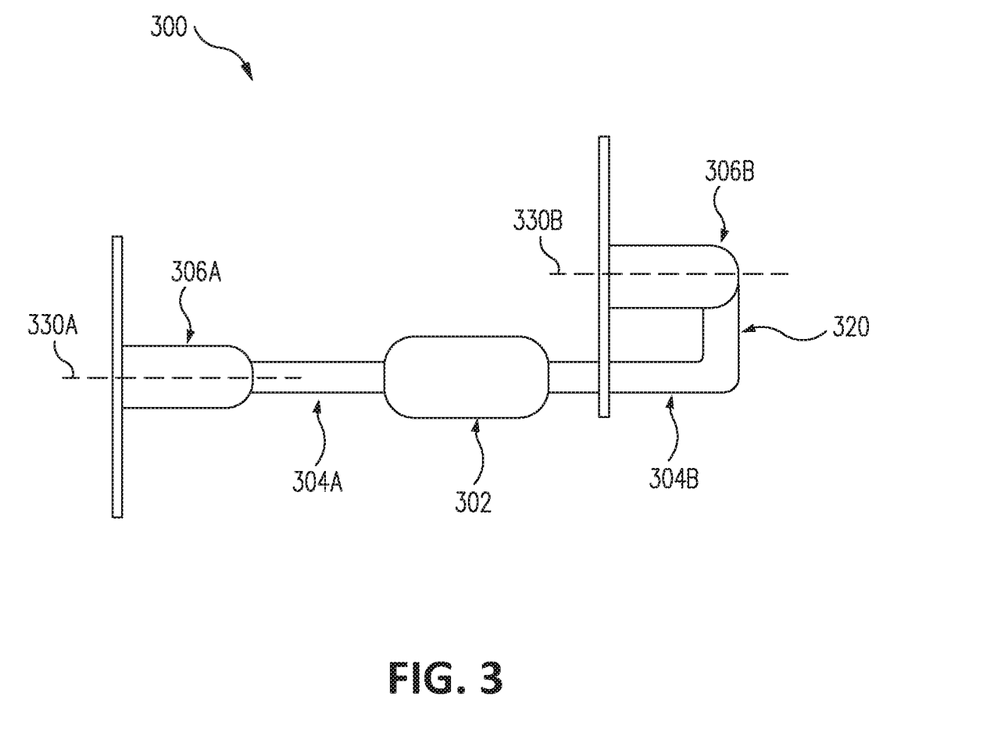
FIG. 3 illustrates a side view of a drone aircraft during operation in accordance with an embodiment of the disclosure.

FIG. 3 illustrates a side view of a drone aircraft during operation in accordance with an embodiment of the disclosure. The drone 300 shown in FIG. 3 can include a drone body 302, wings 304A and 304B, and tilting propeller assemblies 306A and 306B.

As shown in FIG. 3, the drone 300 can be traveling in cruise flight. As such, the drone 300 can be traveling substantially horizontally. As oriented, the tilting propeller assembly 306A can be in a third position (e.g., another position for cruise flight) and the forward portion of the drone 300. The rotation axes 330A and 330B of the propellers can be in a substantially horizontal orientation.

When traveling in cruise flight, wings 304A and 304B can generate lift. As such, the tilting propeller assemblies 306A and 306B do not need to provide upward thrust or need to provide a lower amount of upward thrust than conventional drones. The wings 304A and 304B can be positioned so that they are at least partially within an airstream so that they can provide lift. In certain examples, the wings geometry and/or span of the wings 304A and 304B can be configured so that they provide lift to at least maintain altitude when the drone 300 is in cruise flight, but other examples can configure to wings to provide additional lift so that the drone 300 can gain elevation with the tilting propeller assemblies in the third position.

Wing 304B of the drone 300 can include a riser 320. The riser 320 can be a portion of the wing 304B that elevates the location of the tilting propeller assembly 306B relative to the tilting propeller assembly 306A. In certain examples, the riser 320 can be configured to provide improved control due to the offset of the propeller assemblies 306A and 306 (e.g., due to the offset of axes 330A and 330B). Additionally, other examples of the wing 304B can lack the riser 320. Instead, such an example can locate the wing 304B so that the tilting propeller assembly 306B is located higher than the tilting propeller assembly 306A (e.g., by tilting the wing 304B).

As shown in FIG. 3, the drone 300 can be configured to travel in a direction so that the tilting propeller assembly 306A is the front of the drone 300. As such, locating the tilting propeller assembly 306B higher than the tilting propeller assembly 306A allows for the propellers of the drone 300 to more effectively control the drone 300 during cruise flight. As axes 330A and 330B are offset, the configuration of the tilting propeller assemblies 306A and 306B of the drone 300 allows for better control due to offset thrust from the propellers as well as allow for reduced interference from downwash from the forward propeller (e.g., tilting propeller assembly 306A) on the rear propeller (e.g., tilting propeller assembly 306B).

When the propeller assemblies 306A and 306B are in the third position shown in FIG. 3, the propeller assemblies 306A and 306B can be used exclusively for generating forward thrust. As such, all lift produced by the drone 300 is produced by the wings 304A and 304B. In certain examples, when the propeller assemblies 306A and 306B are in the first position shown in FIG. 2A, the wings 304A and 304B can be in the position shown in FIG. 5B and/or in the position shown in FIG. 5C.

Figure 4A:
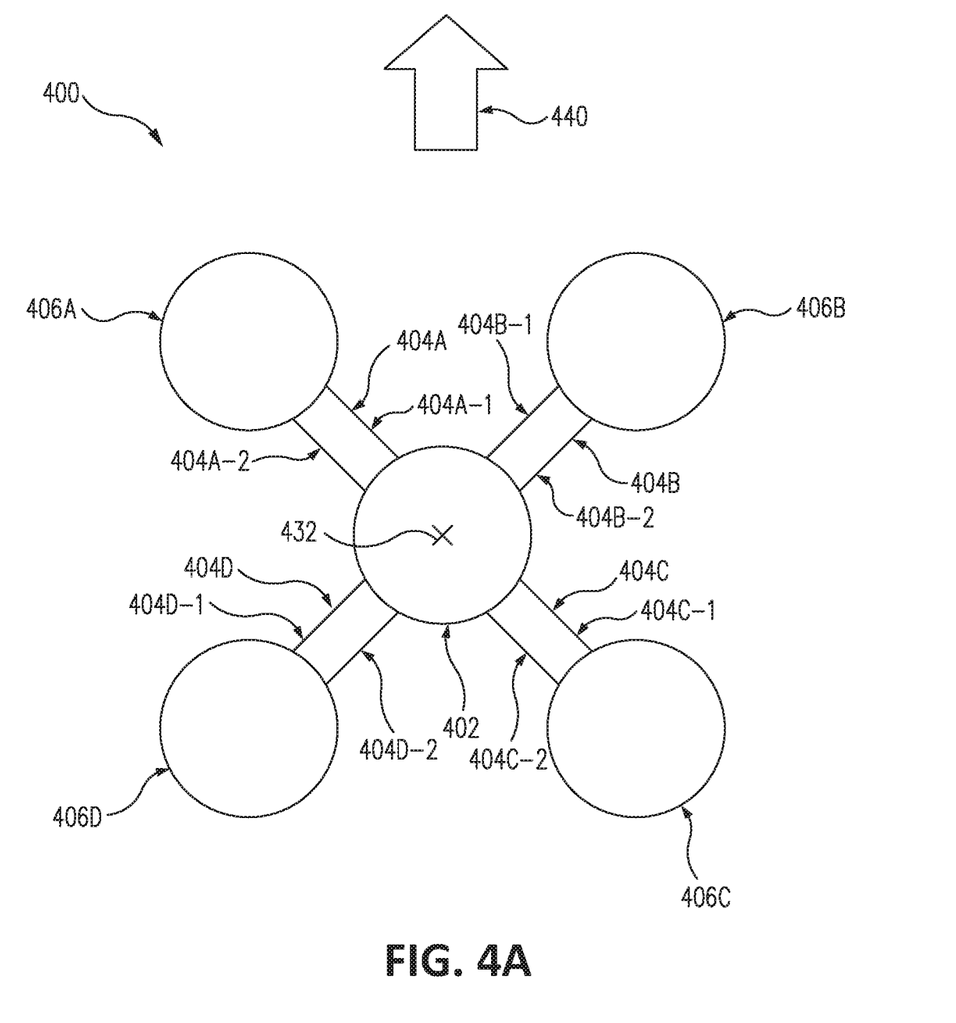
FIGS. 4A and 4B illustrate top views of a drone aircraft during various stages of operation in accordance with an embodiment of the disclosure.
Figure 4B:
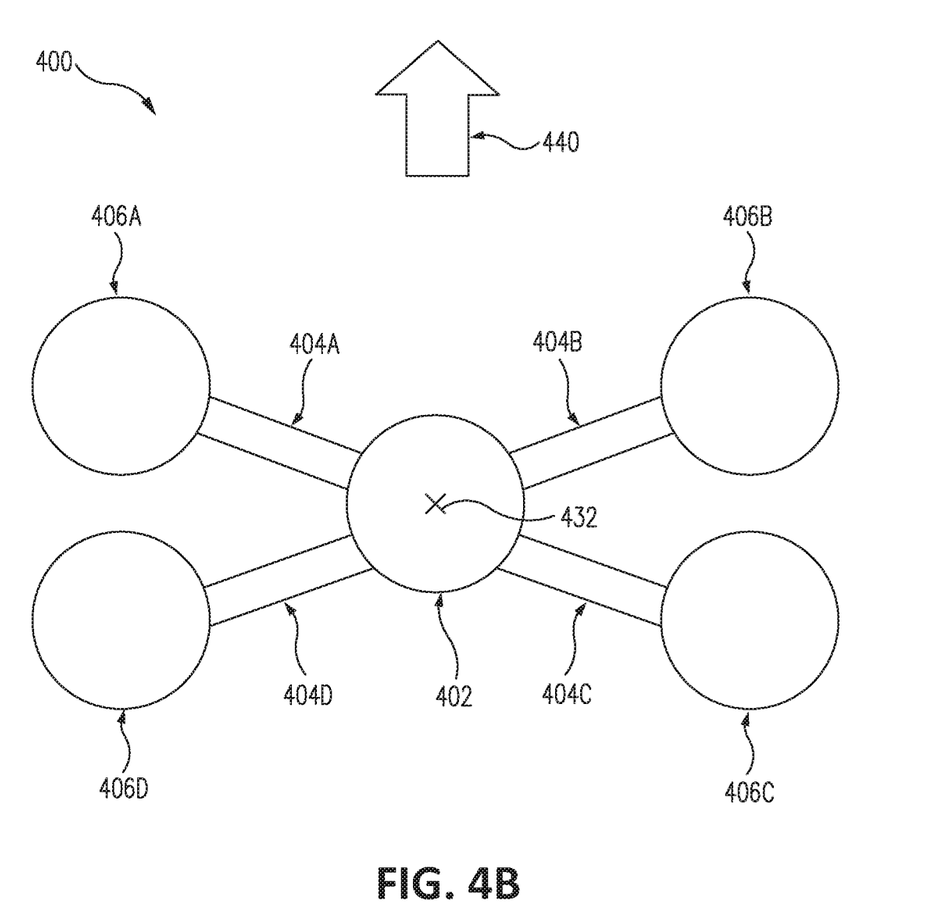

FIGS. 4A and 4B illustrate top views of a drone aircraft during various stages of operation in accordance with an embodiment of the disclosure. FIGS. 4A and 4B illustrate a drone 400 that includes a drone body 402, wings 404A-D, and tilting propeller assemblies 406A-D. The drone 400 also includes a center of gravity 432. As shown, the center of gravity 432 can be disposed within the drone body 402.

As shown in FIG. 4A, the tilting propeller assemblies 406A-D are all disposed at substantially equal distances from the center of gravity 432 (e.g., within +/−10% of the same distance) and/or a vertical axis that intersects the center of gravity 432. Such a configuration allows for the propellers of the tilting propeller assemblies 460A-D to rotate at substantially similar speeds while allowing for the drone 400 to be stable while taking off.

The wings 404A-D of the drone 400 can be fixed or can move. The wings 404A-D can be configured to rotate vertically and/or horizontally and/or translate. Horizontal rotation of the wings 404A-D is shown in FIGS. 4A and 4B. In FIG. 4A, the wings 404A-D are configured so that the tilting propeller assemblies 460A-D are disposed at 90 degree angles from each other (as seen from a top view). In FIG. 4B, the wings 404A-D are configured so that the tilting propeller assemblies 406A and 406D are disposed closer to each other and the tilting propeller assemblies 406B and 406C are disposed closer to each other. However, the tilting propeller assemblies 406A-D of FIG. 4B can all still be disposed substantially equidistant from the center of gravity 432.

The configuration of FIG. 4B can allow for greater lift to be generated by the wings 404A-D when the drone 400 is in cruise flight (e.g., when the drone 400 is flying in direction 440) as a larger frontal area of the wings 404A-D are exposed to airflow. In such an example, the wings 404A-D can be configured to generate lift or generate maximum lift when the wings 404A-D are oriented in the configuration shown in FIG. 4B and the drone 400 is flying in direction 440.

Other examples can include wings that are configured to generate lift or generate maximum lift when oriented in other configurations. Such examples can be configured to move the wings to the configurations that generate lift or generate maximum lift when the drone is moving in forward flight. In certain examples, such as that shown in FIGS. 4A-B, the wings are configured to generate lift when the drone 400 is flying in direction 440 and the leading edge of the wing is not perpendicular to direction 440.

Certain examples of the drone 400 can move the wings 404A-D between the positions shown in FIGS. 4A and 4B (e.g., the drone 400 can be in the position shown in FIG. 4A during take-off, but in the position shown in FIG. 4B during cruise flight). Other examples of the drone 400 can have the wings 404A-D be fixed in one of the positions shown in FIGS. 4A and 4B.

Each of the wings 404A-D can include a leading edge 404A-1, 404B-1, 404C-1, and 404D-1 and a trailing edge 404A-2, 404B-2, 404C-2, and 404D-2. In certain examples, the wings 404A-D can be positioned so that the wings 404A-D are in a specific orientation when the drone 400 is in cruise flight. For examples where the drone 400 is configured for cruise flight with wings 404A-D in the orientation shown in FIG. 4A, each of the wings 404A-D can be oriented at 90 degree angles (e.g., each wing can be at 90 degrees with respect to the wing next to it), and the leading edges 404A-1, 404B-1, 404C-1, and 404D-1 can be oriented at approximately 45 degrees to the direction 440. For examples where the drone 400 is configured for cruise flight with wings 404A-D in the orientation shown in FIG. 4B, the leading edges 404A-1, 404B-1, 404C-1, and 404D-1 can be oriented at more than 45 degrees to the direction 440.

Figure 5A:
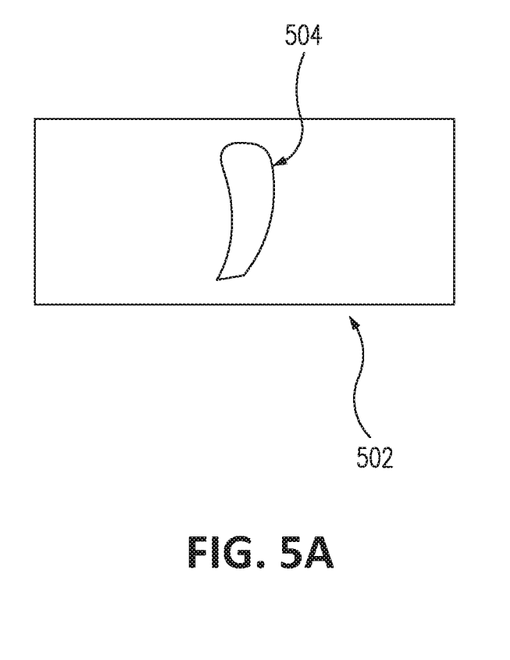
FIGS. 5A and 5B illustrate side views of a drone aircraft wing during various stages of operation in accordance with an embodiment of the disclosure.
Figure 5B:
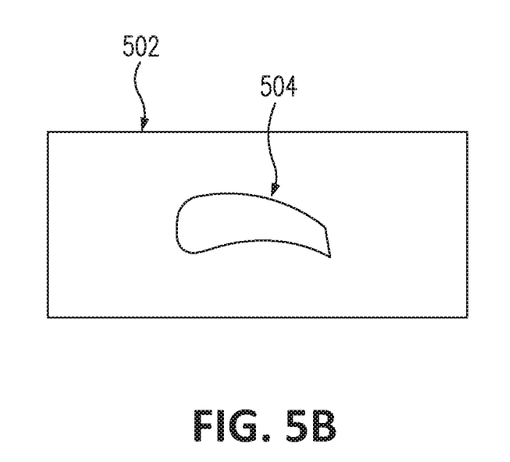

FIGS. 5A and 5B illustrate side views of a drone aircraft wing during various stages of operation in accordance with an embodiment of the disclosure. FIGS. 5A and 5B illustrate a side view of a wing 504 attached to a drone body 502. In certain examples, a drone can be configured to move a wing between the orientations shown in FIGS. 5A and 5B, for example, when transitioning between take-off and cruise flight.

As shown in FIG. 5A, the wing 504 is disposed in a take-off position. In the take-off position, the chord line of the wing 504 can be oriented substantially vertically. In such an orientation, air resistance due to the wing 504 from vertical flight of the drone can be minimized.

In FIG. 5B, the wing 504 is disposed in a cruise flight position. In the cruise flight position, the chord line of the wing 504 can be oriented substantially horizontally. As such, when the drone is in cruise flight and, thus, moving in a substantially horizontal direction, the wing 504 in the cruise flight position can generate lift.

Figure 5C:
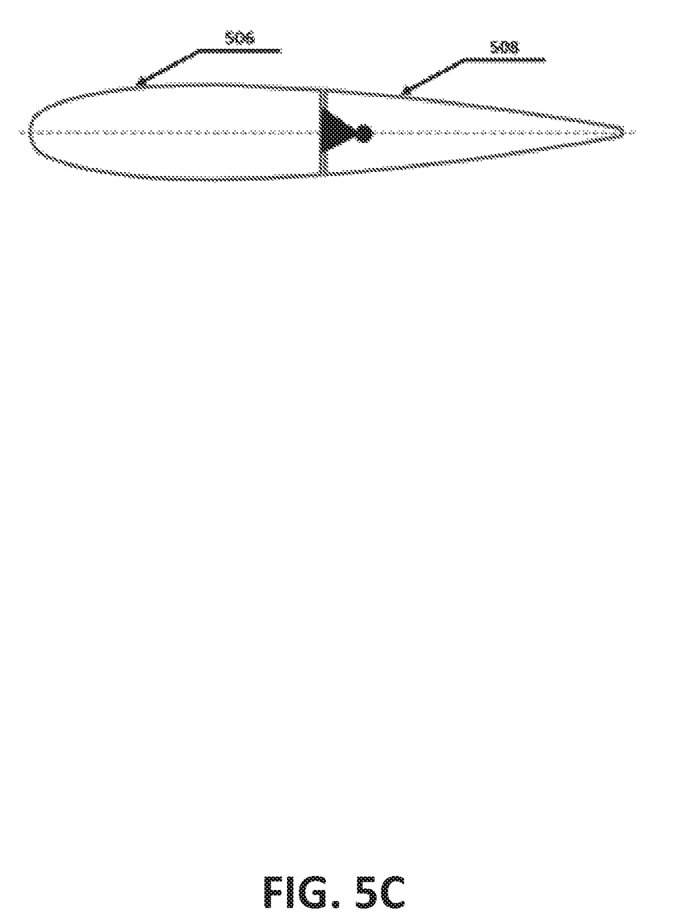
FIGS. 5C and 5D illustrate side views of another drone aircraft wing during various stages of operation in accordance with an embodiment of the disclosure.
Figure 5D:
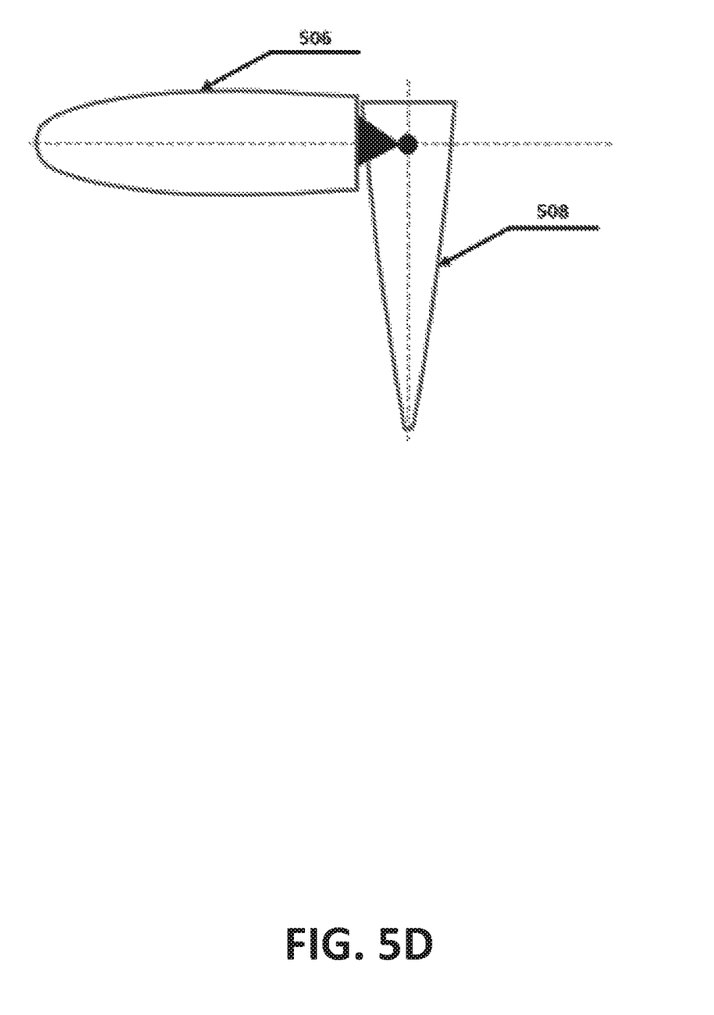

FIGS. 5C and 5D illustrate side views of another drone aircraft wing during various stages of operation in accordance with an embodiment of the disclosure. FIGS. 5C and 5D illustrate a side view of a fixed wing portion 506 and a movable wing portion 508. In certain examples, a drone can be configured to move a wing between the orientations shown in FIGS. 5C and 5D by, for example, moving the movable wing portion 508. The configuration shown in FIGS. 5C and 5D can be coupled to any configuration of movable propeller assemblies, including movable propeller assemblies that move independent of the wings.

As shown in FIG. 5C, the movable wing portion 508 is disposed in a cruise flight position. In such a configuration, the drone can be moving in a forward direction and the wing portion 508 can be disposed to minimize drag and/or produce lift.

In FIG. 5D, the movable wing portion 508 is disposed in a deployed position. In such a deployed position, the propeller assemblies of the drone can be oriented at a large angle of incidence to the wing (e.g., can be disposed at an angle of incidence similar to that shown in FIG. 2B). The movable wing portion 508 is oriented to reduce the effect of propeller downwash on the wing when the propeller is oriented at the large angle of incidence.

Each of the propeller assembly and wings described in FIGS. 2A to 5D can each be moved independent of movements of other propeller assemblies and/or wings. Thus, the wings of a drone can move independently of the propeller assemblies, each of the wings can move independently of other wings, and each of the propeller assemblies can move independently of other propeller assemblies. In other examples, at least some of the wings and propeller assemblies can move in concert, at least some of the wings can move in concert with each other, and/or at least some of the propeller assemblies can move in concert with each other. As such, any of the positions described in FIGS. 2A to 5D are optional positions.

The propeller assembly and wing positions described herein are for illustrative purposes only. Other examples of such drones can orient the wings and/or propeller assemblies in one or more other wing or propeller assembly positions.

Figure 6:
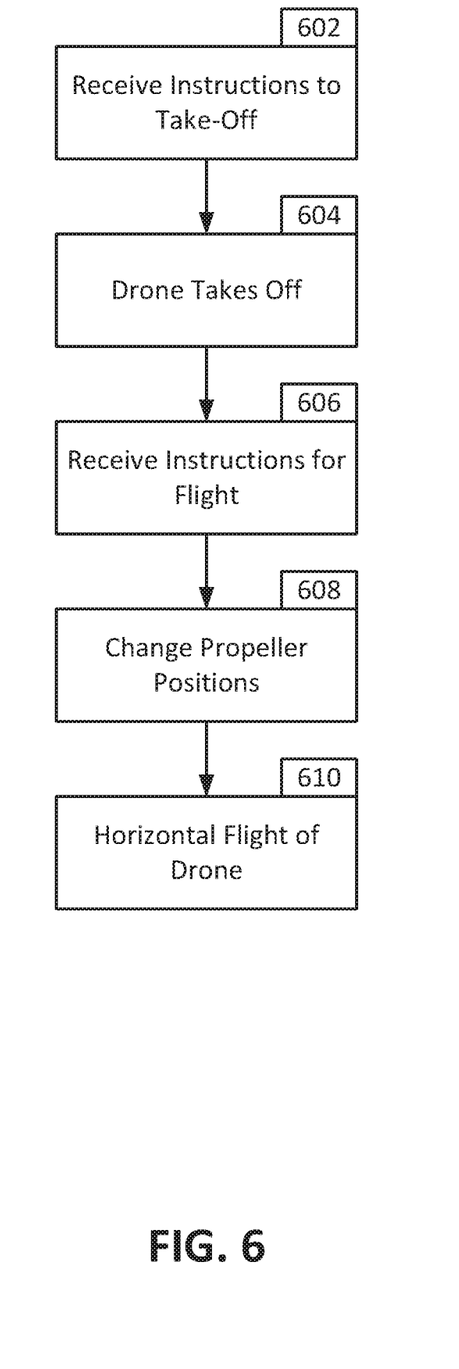
FIG. 6 is a flowchart illustrating a method of operating a drone aircraft in accordance with embodiments of the disclosure.

FIG. 6 is a flowchart illustrating a method of operating a drone aircraft in accordance with embodiments of the disclosure. In block 602, the drone receives instructions for takeoff. The instructions for takeoff can be provided from the drone controller, from instructions communicated by a remote controller, or from another source of instructions for the drone.

In block 604, responsive the instructions of block 602, the drone can takeoff. The drone can take off with the tilting propeller assemblies in the first position. In certain examples, the drone can include one or more movable wings and such wings can be in the takeoff position in block 604.

In block 606, the drone can receive instructions for flight. In certain examples, the instructions for flight can be provided from the drone controller, from instructions communicated by a remote controller, or from another source of instructions for the drone. In certain such examples, upon completing takeoff, the drone controller and/or another controller can automatically provide instructions to the drone for flight so that the drone can conserve energy by utilizing lift generating wings.

In block 608, responsive to the instructions for flight, the tilting propeller assemblies can be moved from the first position to a position used in flight (e.g., the second position, the third position, or another such position). Additionally, any movable wings of the drone can be placed in a cruise flight position.

After block 608, the drone can be used in horizontal flight. In horizontal flight, the drone can fly in a forward direction (e.g., due to forward thrust generated by the tilting propeller assemblies in the second position and/or third position) and the wings of the drone can generate lift. As such, energy consumption requirements of the drone can be decreased as compared to conventional drones due to lift generated by the wings. Accordingly, the size of energy storage (e.g., batteries, fuel tanks, or other energy storage items) can be decreased and the drone lightened, and/or endurance of the drone can be improved.

Examples described above illustrate but do not limit the invention. It should also be understood that numerous modifications and variations are possible in accordance with the principles of the present invention. Accordingly, the scope of the invention is defined only by the following claims.

What is claimed is:

1. A drone comprising:
    a drone body having a central portion;
    a first wing, a second wing, a third wing, and a fourth wing coupled to the drone body and each extending radially from the central portion of the drone body, each wing comprising a front facing leading edge and a rear facing trailing edge and configured to generate lift when the drone travels in a first travel direction;
    a plurality of tilting propeller assemblies, each tilting propeller assembly supported by at least one of the plurality of wings, comprising a propeller and a propeller powerplant connected to the propeller, and configured to move between at least a first position for take-off and a position for cruise flight configured so that the tilting propeller assemblies provide forward thrust;
    wherein a direction of rotation of each of the propellers of the plurality of tilting propeller assemblies is an inboard up direction; and
    wherein the tilting propeller assemblies are substantially symmetrically disposed around a vertical axis intersecting a center of gravity of the drone, and wherein the first wing, the second wing, the third wing, and the fourth wing extend radially from the vertical axis.

2. The drone of claim 1, wherein each of the tilting propeller assemblies is disposed at substantially a same distance from the center of gravity of the drone.

3. A method comprising:
    taking off with a drone by positioning a plurality of tilting propeller assemblies of the drone in a first position, the drone further comprising a drone body having a central portion and a first wing, a second wing, a third wing, and a fourth wing extending radially from a vertical axis of the central portion of the drone body, wherein the vertical axis intersects a center of gravity of the drone and wherein the tilting propeller assemblies are substantially symmetrically disposed around the vertical axis;
    moving the plurality of tilting propeller assemblies from the first position to a position for cruise flight;
    flying the drone with the plurality of tilting propeller assemblies in the position for cruise flight in a first travel direction to generate lift from the first wing, the second wing, the third wing, and the fourth wing of the drone, wherein each wing comprises a front facing leading edge and a rear facing trailing edge; and
    wherein a direction of rotation of each of the propellers of the plurality of tilting propeller assemblies is an inboard up direction.

4. The drone of claim 1, wherein each of the tilting propeller assemblies is disposed at substantially a same distance from a center of gravity of the drone.

5. The drone of claim 1, wherein the plurality of tilting propeller assemblies comprise at least a forward propeller assembly and a rearward propeller assembly, wherein the forward propeller assembly is disposed at a first height relative to the drone body, wherein the rearward propeller assembly is disposed at a second height relative to the drone body, and wherein the second height is higher than the first height during normal operation of the drone.

6. The drone of claim 1,
    wherein in a takeoff position, an angle between each of the wings and about a vertical axis is 90 degrees,
    wherein in a cruise flight position, an angle about the vertical axis and between the first wing and the second wing, and an angle about the vertical axis and between the third wing and the fourth wing is less than 90 degrees, and an angle about the vertical axis and between the second wing and the third wing, and an angle about the vertical axis and between the fourth wing and the first wing is greater than 90 degrees, and
    wherein moving between the takeoff position and the cruise flight position comprises tilting the plurality of tilting propeller assemblies.

7. The drone of claim 6, wherein the first wing, the second wing, the third wing, and the fourth wing are configured to move to the takeoff position at least when the plurality of tilting propeller assemblies are in the first position and configured to move to the flight position at least when the plurality of tilting propeller assemblies are in the position for cruise flight.

8. The drone of claim 1, wherein at least one of the plurality of tilting propeller assemblies is configured to operate in autorotation.

9. The drone of claim 1, wherein the first position is a position where the propellers are configured for vertical flight with propeller rotation axes of the propellers in a substantially vertical orientation.

10. The drone of claim 1, wherein the propeller powerplants are battery powered.

11. The drone of claim 1, further comprising a drone controller configured to:
provide instructions associated with takeoff of the drone comprising moving the plurality of tilting propeller assemblies to the first position; and
provide instructions associated with horizontal flight of the drone comprising moving the plurality of tilting propeller assemblies to the position for cruise flight.

12. The drone of claim 11, wherein the drone controller is configured to provide instructions to the plurality of tilting propeller assemblies to move between at least the first position and the position for cruise flight responsive to a position, velocity, acceleration, and/or direction of the drone.

13. The drone of claim 11, further comprising communications circuitry configured to receive instructions from a remote controller separate from the drone body, wherein the drone controller is communicatively coupled to the communications circuitry and configured to provide instructions to the plurality of tilting propeller assemblies to move between at least the first position and the position for cruise flight responsive to the instructions received from the remote controller.

14. The drone of claim 13, further comprising the remote controller, wherein the remote controller is configured to provide instructions to the drone controller to move the plurality of tilting propeller assemblies between the first position and the position for cruise flight.

15. The drone of claim 11, further comprising an environmental sensor coupled to the drone body, wherein the drone controller is configured to provide instructions to the plurality of tilting propeller assemblies to move between at least the first position and the position for cruise flight responsive to data from the environmental sensor.

16. A method comprising:
taking off with a drone by positioning a plurality of tilting propeller assemblies of the drone in a first position, the drone further comprising a drone body having a central portion and a first wing, a second wing, a third wing, and a fourth wing extending radially from the central portion of the drone body;
moving the plurality of tilting propeller assemblies from the first position to a position for cruise flight;
flying the drone with the plurality of tilting propeller assemblies in the position for cruise flight in a first travel direction to generate lift from the first wing, the second wing, the third wing, and the fourth wing of the drone, wherein each wing comprises a front facing leading edge and a rear facing trailing edge; and
wherein a direction of rotation of each of the propellers of the plurality of tilting propeller assemblies is an inboard up direction.

17. The method of claim 16, wherein the position for cruise flight comprises a second position with propeller rotation axes of the propellers disposed at a non-horizontal angle and a third position with propeller rotation axes of the propellers disposed in a substantially horizontal orientation.

18. The method of claim 16, further comprising:
positioning the first wing, the second wing, the third wing, and the fourth wing in a takeoff position, such that an angle between each of the wings and about a vertical axis is 90 degrees; and
positioning the first wing, the second wing, the third wing, and the fourth wing in a cruise flight position, such that an angle about the vertical axis and between the first wing and the second wing and an angle about the vertical axis and between the third wing and the fourth wing is less than 90 degrees, and an angle about the vertical axis and between the second wing and the third wing and an angle about the vertical axis and between the first wing and the fourth wing is greater than 90 degrees.

19. The method of claim 16, further comprising modifying at least one wing to modify an aerodynamic load.

* * * * *